Figure 1:
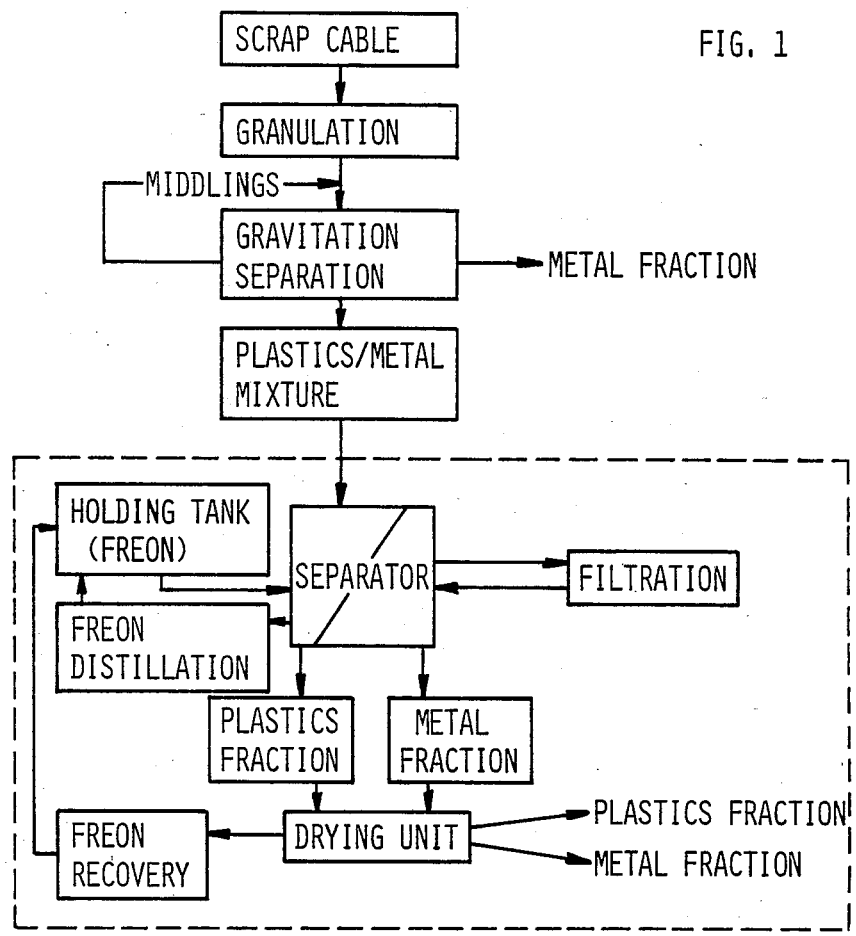

United States Patent [19]

Rasmussen

[11] Patent Number: 4,578,184

[45] Date of Patent: Mar. 25, 1986

[54] PROCESS FOR NON-DESTRUCTIVE SEPARATION OF MIXTURES CONTAINING PLASTICS SCRAP

[75] Inventor: Erik Rasmussen, Klampenborg, Denmark

[73] Assignee: Aktieselskabet Nordiske Kabel-OG Traadfabriker, Copenhagen, Denmark

[21] Appl. No.: 530,578

[22] PCT Filed: Dec. 23, 1982

[86] PCT No.: PCT/DK82/00114

§ 371 Date: Aug. 16, 1983

§ 102(e) Date: Aug. 16, 1983

[87] PCT Pub. No.: WO83/02281

PCT Pub. Date: Jul. 7, 1983

[30] Foreign Application Priority Data

Dec. 23, 1981 [DK] Denmark .............................. 5736-81

[51] Int. Cl.$^4$ .............................................. B03B 5/28
[52] U.S. Cl. .......................................... 209/3; 209/172
[58] Field of Search ...................... 209/3, 10, 11, 162, 209/163, 172, 171, 172.5

[56] References Cited

U.S. PATENT DOCUMENTS

| | | | |
|---|---|---|---|
| 3,122,498 | 2/1964 | Werner | 209/3 |
| 3,335,966 | 8/1967 | Haverman | 209/3 |
| 3,666,691 | 5/1972 | Spiller . | |
| 3,749,322 | 7/1973 | Reynolds | 209/3 |
| 3,836,486 | 9/1974 | Hafner . | |
| 3,877,474 | 4/1975 | Urssing et al. . | |
| 3,992,288 | 11/1976 | Kling | 209/10 |
| 4,059,604 | 11/1977 | Kresse | 209/10 |
| 4,252,639 | 2/1981 | Smith et al. | 209/172 |
| 4,332,677 | 6/1982 | Budzich | 209/3 |

FOREIGN PATENT DOCUMENTS

| | | |
|---|---|---|
| 2328448 | of 0000 | Fed. Rep. of Germany . |
| 44812 | 3/1980 | Japan .................................... 209/10 |

OTHER PUBLICATIONS

Roe & Tueter–Application of Heavy–Liquid Processes to Mineral Benefaction–Soc. of Mech. Engrs., Jun. 63, pp. 141–146.

Primary Examiner—Bernard Nozick
Attorney, Agent, or Firm—Ladas & Parry

[57] ABSTRACT

Sink/float separation of finely divided mixtures of scrap plastics and non-plastics materials, such as metal and glass, by addition of a liquid halogenated hydrocarbon being substantially chemically inert towards the components of the mixture, having essentially no swelling or dissolving effect on the plastics components and having an intermediate density adapted to the densities of the plastics and non-plastics components, preferably a chlorofluoro-substituted aliphatic hydrocarbon, such as 1,1,2-trichloro-1,2,2-trifluoroethane, and then the resulting non-sedimented and sedimented fractions are separated and, if desired, subjected to further separation treatments, while the halogenated hydrocarbon is recycled.

The process is non-destructive and particularly useful for separation of finely divided scrap wire, glass or cable, such as PVC/Cu, rubber/Cu, PEX/Al, PVC/Al, PE/Cu or mixtures thereof. Addition of density-adjusting additives permits separation of various types of plastics and it is also possible to extract and recover additives, such as plasticizers.

11 Claims, 4 Drawing Figures

PROCESS FOR NON-DESTRUCTIVE SEPARATION OF MIXTURES CONTAINING PLASTICS SCRAP

The present invention relates to a process for non-destructive separation of mixtures containing scrap plastics material and non-plastics materials, such as metal and glass, by sink/float separation of a finely divided mixture of materials in a liquid separating medium.

In recent years upgrading of plastics materials and metal and glass contained in various types of scrap has become ever more important, because of the increasing prices of raw materials which have rendered reuse more attractive economically, and because of the more stringent environmental regulations which have made reuse a requirement or at any rate a wish on the part of the authorities.

The object of the present invention is to provide a versatile and flexible separating process which is non-destructive and thus enables reclamation of both the constituent plastics materials, and the constituent non-plastics materials, such as metal and glass in an undamaged state, so that they are readily useful as raw materials in the common methods of processing the materials.

The invention will be explained in the following with reference to a mixture of materials in a category which is particularly difficult to separate, viz. wire and cable scrap which contains plastics materials as well as metals, but the invention is equally applicable to mixtures in which part of the material originates from other scrap processing procedures, and the non-plastics materials may e.g. also contain glass from the production of optical fibres or of another origin.

The greatest advantages of the invention, however, are within the upgrading of scrap cable since the previously used methods have either resulted in an insufficient separation of metals and plastics materials or have focussed on reclamation of one type of materials while destroying or decomposing the other one.

Examples of the known cable or wire scrap processing types are:

(A) Manual separation of metal and plastics (insulation)
(B) Combustion or pyrolysis of plastics (insulation)

Substitution of disintegration, e.g. granulation, for these rough methods, which do not require any noticeable pre-treatment of the material, offers a plurality of possibilities based on gravitation separation:

(C) Separation on a shaking table or the like, usually called "mechanical separation", which is widely used
(D) Air classification
(E) Water flotation with density-adjusting additives (salts)

Other procedures are:

(F) Electrostatic separation after preceding granulation
(G) Freezing followed by mechanical separation
(H) Swelling or dissolution of plastics by means of organic solvents optionally followed by mechanical separation.

Manual processing (method A) and freezing (method G) share the feature that, for reasons of economy, they are used for the processing of strong cables with a high metal content and big wire dimensions. Further, the plastics fractions have to be granulated and optionally separated after processing before they can be reused.

Combustion or pyrolysis of the plastics material (method B) does not permit of reuse and will not be described in detail.

Swelling of the plastics materials (method H) is e.g. described in the U.S. Pat. No. 3,877,474 (Urssing et al.), in which, with a view to reclamation of the metallic conductor in bales of cable or wire scrap, the insulation is swollen and softened, with simultaneous mechanical treatment, with a chlorinated hydrocarbon, preferably methylene chloride, but also e.g. carbon tetrachloride, ethylene dichloride, propylene dichloride, chlorobenzene, 1,1,1-trichloroethane, perchloroethylene, trichloroethylene or chloroform. The residence time is relatively long; it is stated in the specification that the insulation can be reused, but this has not been rendered probable.

Methods of recovering PVC from PVC/metal mixtures based on dissolution of PVC are described in the U.S. Pat. No. 3,666,691 (Spiller) and No. 3,836,486 (Hafner). These methods are not expedient i.a. owing to the large amount of solvents necessary to dissolve the plastics material, and owing to the different dissolubility of the various plastics, cf. the abovementioned U.S. Pat. No. 3,877,474.

In methods C, D, E, and F, metal and plastics, in particular from an insulation, are separated after granulation. The advantage of effecting the granulation, besides involving significant economic benefits, is that the materials are present in a form which, in principle, makes them easy to separate, and that the insulation material lends itself to reuse, in terms of size and form. Two considerable drawbacks of method C are that there is no separation of the various constituent plastics components of the insulation material and that the separation of metal and plastics is often not sufficiently good. Depending upon what is separated, there is typically a residual metal content in the plastics fraction of 1 to 5% by weight, which necessitates further purification by extrusion before reuse. These impurities cause very frequent blockings, which in turn calls for substitution of filters, the so-called strainer nets. Using air classification and electrostatic separation, the metal content can be reduced further, but these methods entail other problems essentially depending upon grain sizes and grain forms. For example, processing of scrap wire in which the copper is fine intertwined threads, or granulations causing very varying grain distributions unmistakably show that these methods have their limits. Electrostatic separation is moreover sensitive to variations in air moisture and barometric height.

Flotation with water (method E) necessitates in most cases an increase in the density of the water, e.g. by addition of salts, since most plastics materials, apart from polyethylene, have densities above 1. However, such salts have a corroding effect on metals and are accordingly not applicable to processing of scrap cable when metal reclamation is important.

A variant of method H is very superficially discussed in the DE-OS No. 2,328,448, in which PVC/metal scrap is treated with methylene chloride to swell and plasticize PVC with simultaneous mechanical treatment; then the PVC/methylene chloride phase is separated from the metal by being caused to float on an unspecified, presumably aqueous, solution of a density of at least 1.337. Owing to the primitive nature of that publication it is difficult to evaluate, but, on the face of it, it seems to combine the drawbacks of methods H and E.

In view of the above account of the prior art and its drawbacks, it can conclusively be established that there is a need for an industrial separation process for scrap cable and wire which (1) enables effective and rapid separation of metals and plastics in a mixture of finely divided starting materials,
(2) involves no decomposition of the constituent components,
(3) may be combined in a simple manner with methods for further fractionation of the plastics fraction and/or the metal fraction if these are present as mixtures after the mutual separation,
(4) may be adapted to treatment of all forms of scrap cable and wire, optionally by effecting raw material dependent pre-treatments prior to the classical disintegration (granulation) to allow optimum reclamation of all the constituent components,
(5) can be adapted with a view to recovery of additives, such as plasticizers, contained in the plastics materials,
(6) is insensitive to variations in the air moisture, barometric height, grain size and form, and is not restricted to specific types of plastics,
(7) involves no risk in the form of fire hazards, toxicity, etc.,
(8) in its wider aspect permits simultaneous or separate treatment of scrap types which do not originate from scrap cable, such as plastics materials from packings and the like; glass from the production of optical fibres or packings, and other metal/plastics, metal/glass or glass/plastics mixtures.

These and other needs are satisfied by a process of the type defined in the opening paragraph and characterized by the features stated in the characterizing portion of claim 1.

The invention is based on the surprising finding that halogenated hydrocarbons of the type which partly are substantially chemically inert to the constituent components of the plastics/non-plastics mixture and partly have no significantly dissolving or swelling effect on the plastics materials, are extremely effective as liquid separating agents for plastics and nonplastics materials in sink/float separation and cause almost instantaneous separation of the two types of materials.

Therefore, the invention also relates to a separating medium for use in the present process.

Without being tied down to any specific theory, it is believed that the rapid and effective separation is caused by the extremely good wetting capability of halogenated hydrocarbons concerned to both plastics and non-plastics materials and an appropriate intermediate density. These properties further mean that the halogenated hydrocarbons can be used in subsequent separating steps for the plastics and non-plastics materials, respectively, if they are present in a mixture, because addition of a density-adjusting agent, whose amount and type are to be adapted to the actual composition of the mixture, can bring about an intermediate density enabling new sink/float separation of mixtures of plastics and plastics materials, respectively.

The halogenated hydrocarbons have moreover the advantageous property that they can extract plasticizers and certain other additives from plastics materials. This is specially interesting in connection with separation of mixtures containing soft polyvinyl chloride (PVC), which contains considerable amounts (20 to 25%) of plasticizers, particularly dioctylphthalate (DOP), but also chlorinated alkanes and the like. Extractions of these agents enable recovery of these plasticizers, which are rather expensive, and utilization of the dissolved plasticizers as density-adjusting agents in a subsequent separation step for mixtures of plastics materials.

Thus, e.g. DOP has a density of about 1 and, in a sufficiently high-concentrated solution in the halogenated hydrocarbon, it can therefore be used for separation of e.g. polyethylenes (PE) having densities from about 0.90 to 0.96 g/cm$^3$ and PVC having densities from about 1.35 to 1.45 g/cm$^3$ (hard PVC), and can decrease to about 1.22 g/cm$^3$ (soft PVC) by addition of plasticizers.

In this extraction the constituent PVC is converted to hard PVC which is directly applicable to e.g. manufacture of coils for wires and to various packaging purposes, such as for bolts or tubes and fittings.

The halogenated hydrocarbons useful in the process of the invention are subject to a number of restrictions:

(1) They must be liquid under the pressure and temperature conditions used in the separation.
(2) They must be essentially chemically inert to the plastics and non-plastics materials under the pressure and temperature conditions used in the separation and must not have significantly dissolving or swelling effect on the polymeric materials. Hydrocarbons with a certain swelling capacity may be used, however, as additives for density adjustment or with concrete extractions in view. It is evident that the residence time in the separating medium has to be adapted e.g. to a possible swelling effect, which can be done by simple experiments.
(3) They must have an intermediate density, adapted to the components of the mixture, under the pressure and temperature conditions used in the separation.
(4) In addition to these restrictions in terms of procedure, there are restrictions in practice because of toxicity, fire hazards and the price of the halogenated hydrocarbons useful in principle.

On the basis of these restriction criterions, the skilled person will be able to select the hydrocarbon or hydrocarbons which are most expedient for a concrete separating process, by examining the physical and chemical characteristics of the individual halogenated hydrocarbons.

The following general picture seems to emerge:

(1) Halogenated aliphatic hydrocarbons of the freon type are most suitable because generally they have good wetting characteristics and in liquid state they usually have densities above the density of the common plastics types and below the density of most metals.
(2) The purely chloro-substituted hydrocarbons usually have a swelling or dissolving effect on most plastics, cf. the U.S. Pat. No. 3,877,474, and are therefore less suitable as a separating medium. To this should be added a plurality of environmental problems since most of these compounds are toxic.
(3) Most purely fluoro-substituted hydrocarbons have so low boiling points and most purely iodo-substituted and purely bromo-substituted hydro-substituted carbons are so expensive that they are less interesting.

(4) The chlorofluoro-substituted hydrocarbons generally seem to meet most of the above-mentioned criterions. Most chlorofluoro-substituted methanes are gaseous at room temperature and atmospheric pressure and are, a priori, less suitable if no special apparatus requirements are made. However, Freon 21 ($CHCl_2F$, b.p. 8.92° C.) and Freon 11 ($CCl_3F$, b.p. 23.8° C.) are potential candidates.

Particularly interesting are the chlorofluoro-substituted ethanes. On the basis of the physical characteristics the following compounds appear to be suitable:

|  | b.p. (1.016 bar) | density |
|---|---|---|
| Freon 113 ($CCl_2F$—$CClF_2$) | 47.6° C. | 1.575 (20° C.) |
| Freon 112 ($CCl_2F$—$CCl_2F$) | 26° C. | 1.634 (30° C.) |
| Freon 114 ($CCl_2F$—$CF_3$) | 3.8° C. | 1.456 (30° C.) |

On the other hand, the low boiling points of Freon 115 (−38,7° C.) and Freon 116 (−78.2° C.) seem to exclude these compounds from practical usefulness.

An interesting candidate is Freon 114B2, which also contains bromine (b.p. 47.3° C., density 2.163 g/cm$^3$).

The presently preferred hydrocarbon in the process of the invention is Freon 113, which, as will be seen, has a boiling point and a density suitable for purposes of separation. To this should be added that Freon 113 is incombustible and does not form explosive mixtures with atmospheric air. It has a very high threshold limit value (TLV) of 1000 ppm. In comparison, perchloethylene has a TLV of 350 and trichloroethylene a TLV of 200. This means that Freon 113 has a very low toxicity degree and practically involves no fire hazards, which is very essential because it is often difficult for the staff to avoid some contact with the separating medium during the day-to-day operations and in case of accidents.

As stated, the process of the invention can be used with all possible plastics/non-plastics mixtures, it being possible for the skilled person to select the most suitable separating medium, residence time in the separation tank, temperature, pressure, density-adjusting additives, etc. on the basis of an analysis of the composition of the mixture or by pilot tests.

Typical scrap mixtures of wire and cable which can be separated by the process of the invention include:
(1) PVC/Cu
(2) Rubber/Cu
(3) PEX/Al
(4) PVC/Al, and
mixtures of these.

Other separable plastics types, used e.g. as sheaths for optical fibres, are polycarbonates and polyamides. A plastics material widely used for packaging purposes is polystyrene (density about 1.05 g/cm$^3$). Worthy of mention are also acrylic plastics, such as polymethyl methacrylate and fluoroplastics, e.g. polytetrafluorethylene.

The process of the invention is also useful in connection with separation and processing of scrap containing other plastics-coated metallic objects than cables, as well as glass-containing scrap, e.g. from the production of optical fibers.

The process can also be adapted to processing of a scrap product which is particularly difficult to handle, viz. cable residuals filled with vaseline (petroleum jelly) or similar highly viscous substances. It has been impossible to process such products in practice by any of the known processes because the products are almost impossible to granulate. It has turned out that such scrap cable can be transformed to a useful starting material for the process of the invention by-after an optional preceding slitting of the cable sheath-subjecting it to a degreasing treatment with a halogenated hydrocarbon, optionally of the same type as the one used in the later separation treatment, or a mixture of hydrocarbons.

It is stressed in the foregoing that, also after density adjustment, the halogenated hydrocarbon used in the process of the invention can be used for a subsequent separation of plastics/plastics or metal/metal (fractionation).

However, this subsequent separation is not restricted to the use of the same separating medium or even separating method as used in the plastics/non-plastics separation.

Thus, instead of adjusting the density of the halogenated hydrocarbon, a hydrocarbon with a density adapted to the actual materials to be separated may be used. For example, Cu and Al can be separated with $C_2H_2Br_4$.

Non-hydrocarbons can be used as well, it being possible to fractionate a separated plastics mixture by means of water, water/alcohol mixtures or aqueous salt solutions, optionally admixed with surfactants to utilize differences in wettability. Finally, the plastics mixtures can also be fractionated by common separating methods, such as air classification or mechanical or electrostatic separation.

These separation treatments known per se are particularly useful in continuation of the plastics/non-plastics separation by the process of the invention, owing to its very great selectivity causing a substantially total removal of non-plastics material and thus elimination of a serious drawback of a plurality of the known separating methods.

The invention is illustrated more fully in the drawing, in which

Figure 2:
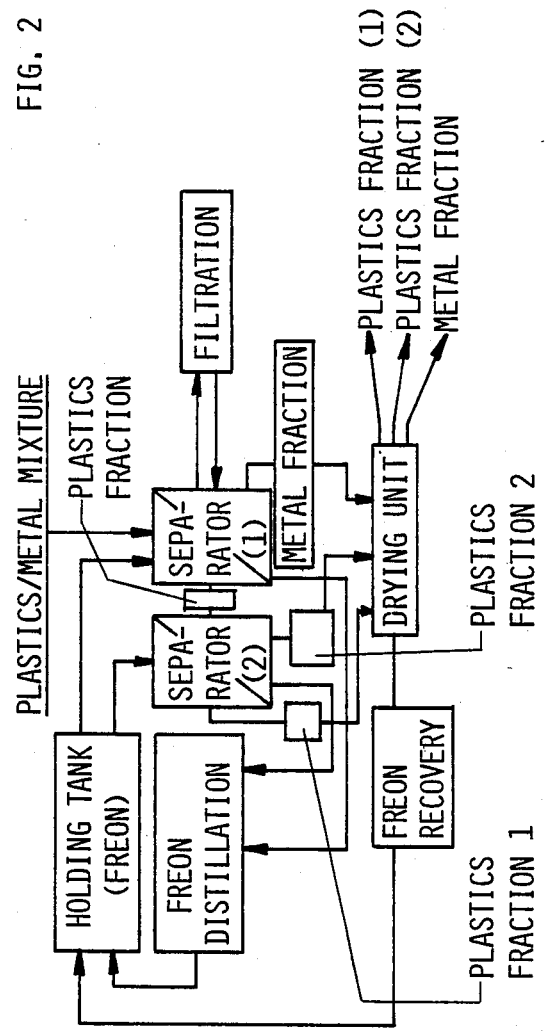
Figure 3:
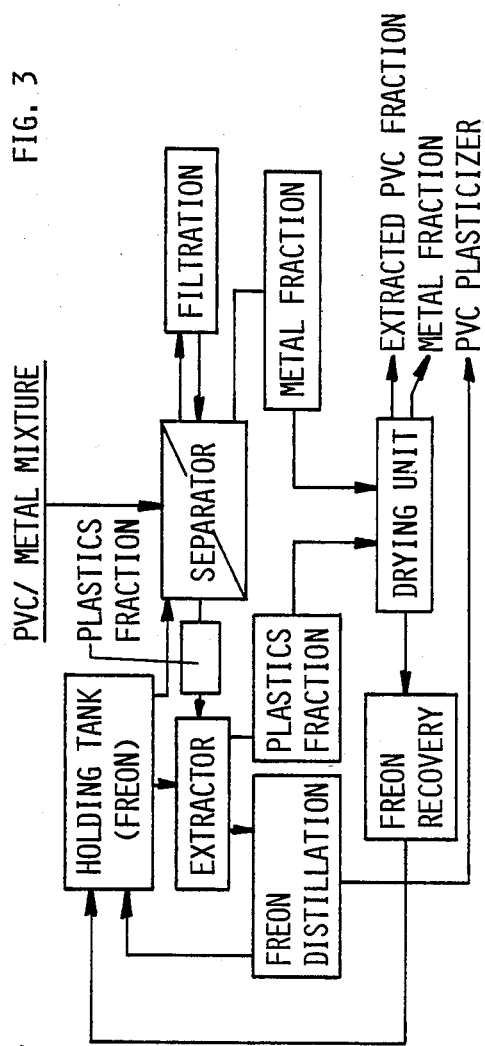
Figure 4:
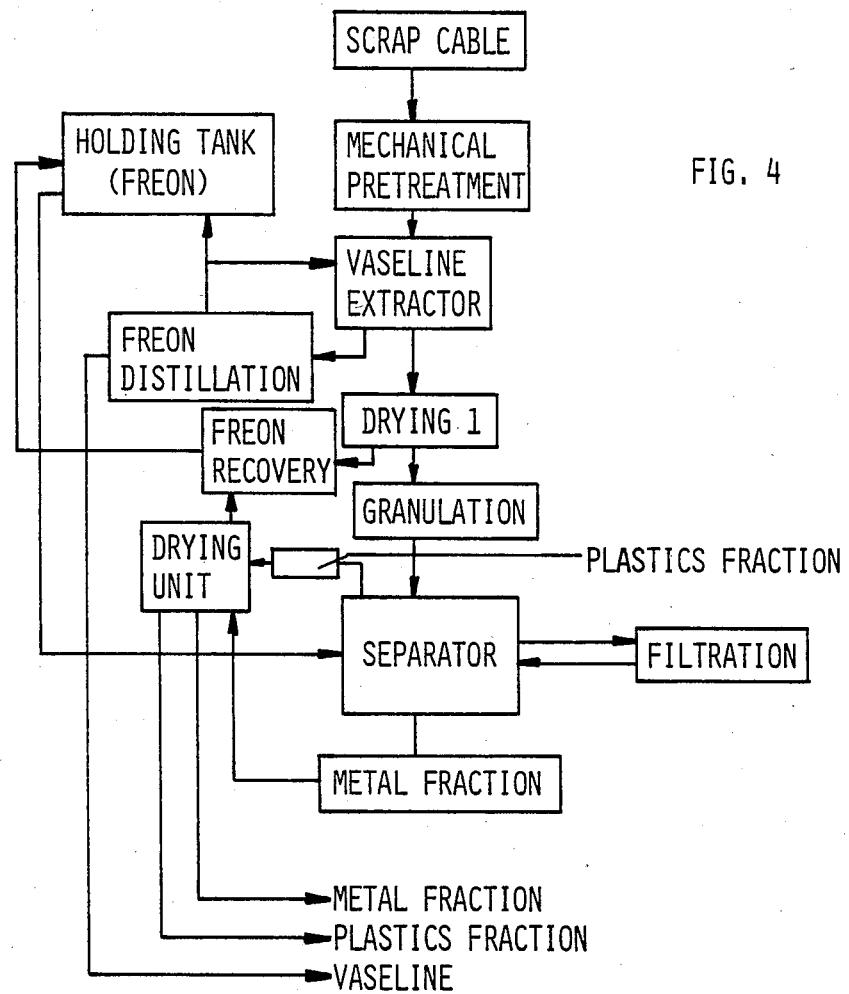

FIG. 1 shows a flow sheet for a scrap cable treatment by the process of the invention, including the necessary pretreatments of the starting material, FIG. 2 shows a flow sheet for an embodiment of the process of the invention in which the separated plastics fraction is subjected to further fractionation, FIG. 3 shows a flow sheet for an embodiment of the process of the invention in which PVC is separated from metal and is also freed of plasticizers by extraction, and FIG. 4 shows the process of the invention adapted to separation of vaseline-filled scrap cable, including the necessary pretreatments.

As will be seen in FIG. 1, the scrap cable is first subjected to granulation, in a manner known per se, in knife mills, hammer mills or similar means. This is followed by mechanical separation (gravitation separation) e.g. on a shaking table, causing some metal to be separated. The mechanical separation provides a fraction, called middlings, which contains about 15% metal and which, if desired, can be recycled to the mechanical separation. The plastics fraction thus obtained still has a considerable content of metal, typically 1 to 5% by weight. This amount can be further decreased, if desired, by air classification or electrostatic separation. Until this stage, the pretreatments represent the prior art described above. The need for and extent of the pretreatments of course depend upon the actual scrap type, and it is thus often possible to transfer the granulate directly to the separating process.

The resulting granulated and optionally pre-fractionated metal/plastics mixture is then transferred to a separator, whose construction is explained in greater detail below in connection with separation tests carried out in practice, and which contains a predetermined amount of halogenated hydrocarbon, e.g. Freon 113.

After a suitable residence time the fractions are separated as the metal fraction has sedimented and can be removed from the bottom of the tank and be dried. The plastics fraction has not sedimented, but is likewise removed and dried.

The separating medium can be recycled to separation containers through a filter removing any present non-dissolved impurities, or it can be cleaned of dissolved impurities by distillation and be transferred to a holding tank. Any separating medium given off during drying can likewise be recovered by condensation and be transferred to the holding tank.

As will be seen, it is possible to carry out the process continuously, which is of great importance in practice.

FIG. 2 shows an embodiment of the process of the invention in which the plastics fraction, after separation from the metal fraction, is subjected to additional separation in two plastics fractions. The flow sheet differs from FIG. 1 essentially only in that a separator 2 is inserted. As a practical example may be mentioned a mixture of PE and PVC which can be separated by adjustment of the density of the separating medium (e.g. Freon 113) with a substance inert to both types of plastics, e.g. a plasticizer for PVC, such as dioctylphthalate. The plasticizer can be distilled off again before the separating medium is transferred to the holding tank.

The embodiment shown in FIG. 3 illustrates separation of PVC/metal-containing scrap with simultaneous recovery of plasticizer for PVC by extraction. This extraction can of course in principle take place in the separator by suitable selection of residence time, temperature, pressure, separating medium, and optionally extraction-promoting additives or solvents, but in consideration of the desirability of a continuous separating process it is generally preferred to transfer the PVC fraction to an extractor when the separation from the metal has taken place.

It is clear that this embodiment is not restricted to extraction of plasticizer for PVC, but lends itself to recovery of all possible extractable additives and impurities from plastics materials by variation of the above-mentioned parameters in connection with extraction in the separator. The concrete selection can be made by experiments.

Finally, FIG. 4 shows a flow sheet for the process of the invention in connection with separation of grease-containing (vaseline-filled) scrap cable. The scrap is subjected to a mechanical pretreatment (cutting and opening) and then treated in an extractor with a halogenated hydrocarbon, e.g. Freon 113, optionally in mixture with other halogenated hydrocarbons or other extraction-promoting solvents. The scrap cable thus degreased is dried and granulated, and then it can be directly subjected to separation, as explained in connection with FIG. 1. The vaseline-containing Freon can be purified by distillation and the vaseline can be recovered. The other steps are analogous with FIG. 1.

EXAMPLES

The process of the invention is illustrated more fully below in connection with a plurality of concrete plastics/metal separations.

All the tests were carried out at room temperature in a cylindrical laboratory separator having a diameter of 56 cm and a total height of 1.5 m, having a conical bottom with a height of 60 cm and connected to a metal fraction collecting container through a valve. The separator was provided with agitation means and a heat jacket and has a volume of about 230 l.

The amounts of starting material listed in the table below were fed before the addition of 160 to 190 l of Freon 113, depending upon the amount and type of the starting material, with topping up as required to ensure homogeneous distribution and wetting of the material. Agitation was effected for the periods of time listed in the table, and then the separated fractions were removed, dried and analysed.

The results appear from the table, which for purpose of comparison (test Sl) includes a copper/PVC mixture which has been riddled, screened and air-classified and then electrostatically separated. By comparison between tests E and Sl it will be seen that with the same starting materials the process of the invention results in a reduction in the copper content from 0.23% down to 0.04 to 0.06%.

TABLE I

| Starting materials | Amount kg | | | Agitation min. |
|---|---|---|---|---|
| | | % Al start | % Al end | |
| A: Aluminum/PE (XL) | 35 | 9.5 | 0.13 | 20 |
| Aluminium/PE (XL) | 45 | 9.5 | 0.27 | 30 |
| Aluminium/PE (XL) | 35 | 9.5 | 0.18 | 45 |
| Aluminium/PE (XL) | 40 | 9.5 | 0.18 | 60 |
| B: Aluminium/PVC | 65 | 3.1 | 0.05 | 15 |
| | | % Cu start | % Cu end | |
| C: Copper/PE | 40 | 0.8–1 | 0.024 | 15 |
| D: Copper/Rubber | 40 | 1.2 | 0.14 | 15 |
| E: *Copper/PVC (fine wire) | 75 | 1.5 | 0.05 | 15 |
| *Copper/PVC (fine wire) | 65 | 1.5 | 0.04 | 15 |
| *Copper/PVC (fine wire) | 75 | 1.5 | 0.06 | 15 |
| F: Copper/PVC (Middlings) | 75 | 14.5 | 0.06 | 15 |
| Copper/PVC (Middlings) | 75 | 9.5 | 0.08 | 15 |
| Sl (Comparison:) **Copper/PVC (fine wire) | — | 1.5 | 0.23 | — |

*Riddled, screened and air classified before separation
**Riddled, screened, air classified and electrostatically separated The usefulness of the process for extraction of plasticizers for PVC in connection with PVC/Cu separation was also examined in detail. The results are tabulated in the following table 2. The treated PVC was a softened PVC with a considerable content of fillers (chalk) of the type used in the production of flexible wires.

Two different types of starting materials were used, viz. middlings (M1 and M2) and normal scrap (N1 and N2). The above-mentioned S1 was included for comparison, purified of Cu by the best of the known separating methods. The individual measurements were made in accordance with the recommended standards and are averages of several single determinations. All the four samples M1, M2, N1 and N2 were extracted with Freon 113 after separation, N2 for 10 min. and the others for 1½ to 2 hours.

The impurities were counted by visual inspection of sheets rolled from 4 g samples of the materials examined.

TABLE II

| Test | M1 | M2 | N1 | N2 | S1 |
| --- | --- | --- | --- | --- | --- |
| Impurities in 4 g rolled sheet | 3 —Cu | 8 —Cu | about 1 —Cu | about 2 —Cu | 55–60 about 15 Cu |
| Density (g/cm$^3$) | 1.494 | 1.513 | 1.487 | 1.412 | 1.369 |
| Tensile strength (N/mm$^2$) min. 12.5 N/mm$^2$ | 24.0 | 23.0 | 25.0 | 19.2 | 14.4 |
| Elongation at rupture in % min. 12.5% | 163 | 195 | 222 | 294 | 227 |
| Hardness measurement (SHORE D) | 70 | 71 | 66 | 35 | 27 |
| Heat stability at 180° C. (min.) | 66 | 61 | 69 | 77 | 86 |
| Plasticizer content (weight %) | 15.0 | 13.2 | 15.5 | 23.8 | 29.8 |
| Filler determination (weight %) | 23.2 | 24.4 | 23.6 | 21.4 | 18.2 |
| PVC content (weight %) | 61.4 | 61.7 | 60.5 | 54.5 | 51.9 |
| Brabender plastograph, min. moment kpm × 10$^3$ | 1420 | 1400 | 1180 | 740 | 520 |
| Brabender plastograph, max. moment kpm × 10$^3$ | 2900 | 3300 | 2830 | 2380 | 1890 |

I claim:

1. A process for non-destructive separation of mixtures containing plastics scrap and scrap metals or glass or mixtures thereof which comprises separation of a mixture of finely divided plastic and metal or glass scrap materials or mixtures thereof in a sedimented and a non-sedimented fraction by means of a liquid separating medium containing a halogenated hydrocarbon by adding the mixture of finely divided scrap material to a liquid halogenated hydrocarbon which is substantially chemically inert towards the components of the mixture and has essentially no swelling or dissolving effect on the plastics components and which has an intermediate density in relation to the densities of the plastics and metal or glass components and separating the resulting non-sedimented plastics and sedimented metal or glass said liquid separating medium requiring no further preconditioning and no mercuric chloride.

2. A process as in claim 1, wherein said mixture to be separated contains plastic and aluminum.

3. A process according to claim 1 wherein the halogenated hydrocarbon is a chlorofluoro-substituted aliphatic-hydrocarbon.

4. A process according to claim 3, wherein the halogenated hydrocarbon is 1,1,2-trichloro-1,2,2-trifluoroethane.

5. A process according to claim 1 wherein the plastic is soft PVC with recovery of the contained plasticizers, which comprises using as the separating medium a halogenated hydrocarbon capable of extracting the plasticizers.

6. A process according to claim 5 wherein, subsequently to the separating treatment, the separated PVC fraction is subjected to a supplementary extraction treatment with the halogenated hydrocarbon from which the plasticizer is recovered, preferably by distillation.

7. A process as in claim 5 wherein said halogenated hydrocarbon is Freon 113.

8. A process as in claim 7 wherein said plastics material is PVC plasticized with chalk.

9. A process as in claim 1 wherein the raw materials are finely divided scrap wire or cable.

10. A process as in claim 9 wherein the raw materials are selected from a mixture of poly-ethylene and copper a mixture of cross-linked polyethylene and aluminum, a mixture of PVC and Copper, and a mixture of PVC and Aluminum.

11. A process as in claim 9, wherein the raw materials are scrap from vaseline-filled cables which prior to the separation in Freon 113 have been subjected to a degreasing treatment with a halogenated hydrocarbon and subsequent drying and disintegration.

* * * * *